UNITED STATES PATENT OFFICE.

JOHN JAY LOONEY, OF ST. PETERSBURG, PENNSYLVANIA.

IMPROVEMENT IN CLEANING OIL-WELLS.

Specification forming part of Letters Patent No. 139,010, dated May 20, 1873; application filed November 2, 1872.

*To all whom it may concern:*

Be it known that I, JOHN J. LOONEY, of St. Petersburg, county of Clarion, State of Pennsylvania, have invented certain new and useful Improvements in Device for Renovating and Cleaning Oil-Wells; and I declare the following to be a full, clear, and exact description thereof, such as will enable others skilled in the art to which it pertains to make and use it.

My invention relates to cleaning the well of paraffine and other similar resinous compounds which impede the free flow of oil, by means of chemical ingredients, and consists as follows:

It is well known that an oil-well after considerable use becomes clogged or stopped up to a certain extent with paraffine and other ingredients, which collect and deposit themselves about the openings of oil-ducts. This resinous substance will melt at a temperature below the boiling-point of water. If, therefore, boiling water were thrown into the well, the substance would become melted; but just as soon as the water had become so cool as to congeal the paraffine, the same or a worse deposit would take place again. I therefore propose to first pour into the well a considerable quantity of the solution of potassa. I then pour down a certain amount of sulphuric acid. This acid, uniting with the solution in the well, will generate a considerable heat, which will continue during the existence of the chemical disturbance. This hot solution will soon dissolve away all the paraffine and other resinous substances, which, being of less specific gravity than the solution in the well, will collect at the top of this solution. In this condition it would soon cool off and deposit itself upon the sides of the well again. I, therefore, while the paraffine is yet in solvent form, pour down into the well a quantity of benzine and sulphuric acid, which have been previously mixed together. I have found that this compound or mixture will hold this paraffine in solution after it is cold. When, therefore, this mixture of benzine and sulphuric acid is thrown down, the paraffine is no longer liable to congeal upon reaching its former temperature, and the whole compound in the well can be drawn or pumped off at pleasure.

I do not claim, broadly, the production of chemical heat in the well for the purpose of melting off the paraffine, for this has been done before; but

What I claim as new, and desire to secure by Letters Patent, is—

1. The within-described process of removing the paraffine and other resinous deposits from oil-wells, for the purpose of increasing the flow of oil.

2. The use of the compound or mixture of benzine and sulphuric acid, in the manner and for the purposes set forth and described.

JOHN JAY LOONEY.

Witnesses:
C. REICHART,
E. ALTMAN.